(12) United States Patent
Kawai et al.

(10) Patent No.: US 8,786,348 B2
(45) Date of Patent: Jul. 22, 2014

(54) CONTROL CIRCUIT OF LIGHT-EMITTING ELEMENT

(75) Inventors: Shuhei Kawai, Ota (JP); Yoshio Fujimura, Ora-gun (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 166 days.

(21) Appl. No.: 13/152,326

(22) Filed: Jun. 3, 2011

(65) Prior Publication Data

US 2011/0298395 A1 Dec. 8, 2011

(30) Foreign Application Priority Data

Jun. 3, 2010 (JP) ................................. 2010-128111

(51) Int. Cl.
*H03K 3/00* (2006.01)

(52) U.S. Cl.
USPC ............... 327/298; 327/291; 327/91; 326/52; 326/55; 326/93; 326/97; 326/104; 324/119

(58) Field of Classification Search
USPC .......... 315/307, 200 R, 290; 327/298; 326/55
See application file for complete search history.

(56) References Cited

U.S. PATENT DOCUMENTS

| | | | | |
|---|---|---|---|---|
| 5,276,561 A * | 1/1994 | Fukami | ............................ | 360/32 |
| 7,378,805 B2 * | 5/2008 | Oh et al. | ........................ | 315/291 |
| 7,417,382 B2 * | 8/2008 | Lin | ................................ | 315/225 |
| 7,541,750 B2 * | 6/2009 | Shen et al. | ..................... | 315/291 |
| 7,759,881 B1 * | 7/2010 | Melanson | ...................... | 315/307 |
| 8,330,380 B2 * | 12/2012 | Fujimura et al. | .......... | 315/200 R |
| 2003/0085749 A1 | 5/2003 | Xu et al. | | |
| 2006/0267514 A1 | 11/2006 | Xu | | |
| 2009/0051395 A1 * | 2/2009 | Goh et al. | ...................... | 327/147 |
| 2009/0190631 A1 * | 7/2009 | Hsieh et al. | .................... | 375/130 |
| 2009/0323768 A1 * | 12/2009 | Chan et al. | ..................... | 375/130 |
| 2010/0148681 A1 * | 6/2010 | Kuo et al. | ...................... | 315/193 |
| 2010/0207547 A1 * | 8/2010 | Kuroki et al. | .................. | 315/307 |
| 2010/0219773 A1 * | 9/2010 | Nakai | ............................ | 315/307 |
| 2010/0259180 A1 | 10/2010 | Ren et al. | | |

(Continued)

FOREIGN PATENT DOCUMENTS

| CN | 1729722 A | 2/2006 |
|---|---|---|
| CN | 1784930 A | 6/2006 |
| CN | 101652004 A | 2/2010 |

OTHER PUBLICATIONS

AND8276/D, Solley, Dennis, 'Theory of Operation of V2 Controllers', ON Semiconductor, 2009.*

(Continued)

*Primary Examiner* — Jason M Crawford
*Assistant Examiner* — Christine Johnson
(74) *Attorney, Agent, or Firm* — Rennie William Dover (57) ABSTRACT

A control circuit of a light-emitting element comprises a rectifying unit which full-wave rectifies an alternating current power supply, a clock generator which generates and outputs a clock signal (CLK), a first comparator which compares a comparison voltage (CS) corresponding to a current flowing to the light-emitting element and a reference voltage (REF), and a switching element which is set to an ON state in synchronization with the clock signal (CLK) and which is set to an OFF state when the comparison voltage (CS) becomes greater than the reference voltage (REF) at the first comparator, to switch the current flowing to the light-emitting element. In this structure, a period of the clock signal (CLK) generated in the clock generator is varied, to reduce or inhibit noise.

2 Claims, 5 Drawing Sheets

(56) References Cited

U.S. PATENT DOCUMENTS

| | | | | |
|---|---|---|---|---|
| 2010/0308749 A1* | 12/2010 | Liu | | 315/307 |
| 2011/0109249 A1* | 5/2011 | Liu et al. | | 315/307 |
| 2011/0199145 A1* | 8/2011 | Kawai et al. | | 327/419 |
| 2011/0260651 A1* | 10/2011 | Fujimura et al. | | 315/307 |
| 2011/0266965 A1* | 11/2011 | Xu et al. | | 315/200 R |

OTHER PUBLICATIONS

AND8443/D, ON Semiconductor, Application Note, Timing-Safe Spread Spectrum EMI Reduction, 2010, Rev. 7.*

AND8276, Solley, Dennis, 'Theory of Operation of V2 Controllers', ON Semiconductor 2009.*

AND8428/D Majeika, Matthew, 'Spread Spectrum Techniques to Reduce EMI in SMPS Devices', ON Semiconductor, 2009.*

AND8443/D, ON Semiconductor, Application Note, Timing-Safe Spread Spectrum EMI REduction, 2010, Rev 7.*

Office Action issued in corresponding Chinese Application No. 201110150917.6, mailed May 22, 2013 (10 pages).

Patent Abstract of CN101652004 from Espacenet (1 page), Feb. 17, 2010.

Patent Abstract of CN1729722 from Espacenet (1 page), Feb. 1, 2006.

Patent Abstract of CN1784930 from Espacenet (1 page), Jun. 7, 2006.

* cited by examiner

CONTROL CIRCUIT OF LIGHT-EMITTING ELEMENT

CROSS-REFERENCE TO RELATED APPLICATIONS

The entire disclosure of Japanese Patent Application No. 2010-128111 filed on Jun. 3, 2010, including specification, claims, drawings, and abstract, is incorporated herein by reference in its entirety.

BACKGROUND

1. Technical Field

The present invention relates to a control circuit which controls a light-emitting element.

2. Background Art

There is being developed an illumination system which uses a light-emitting diode (LED) as a light-emitting element for illumination.

Figure 4:
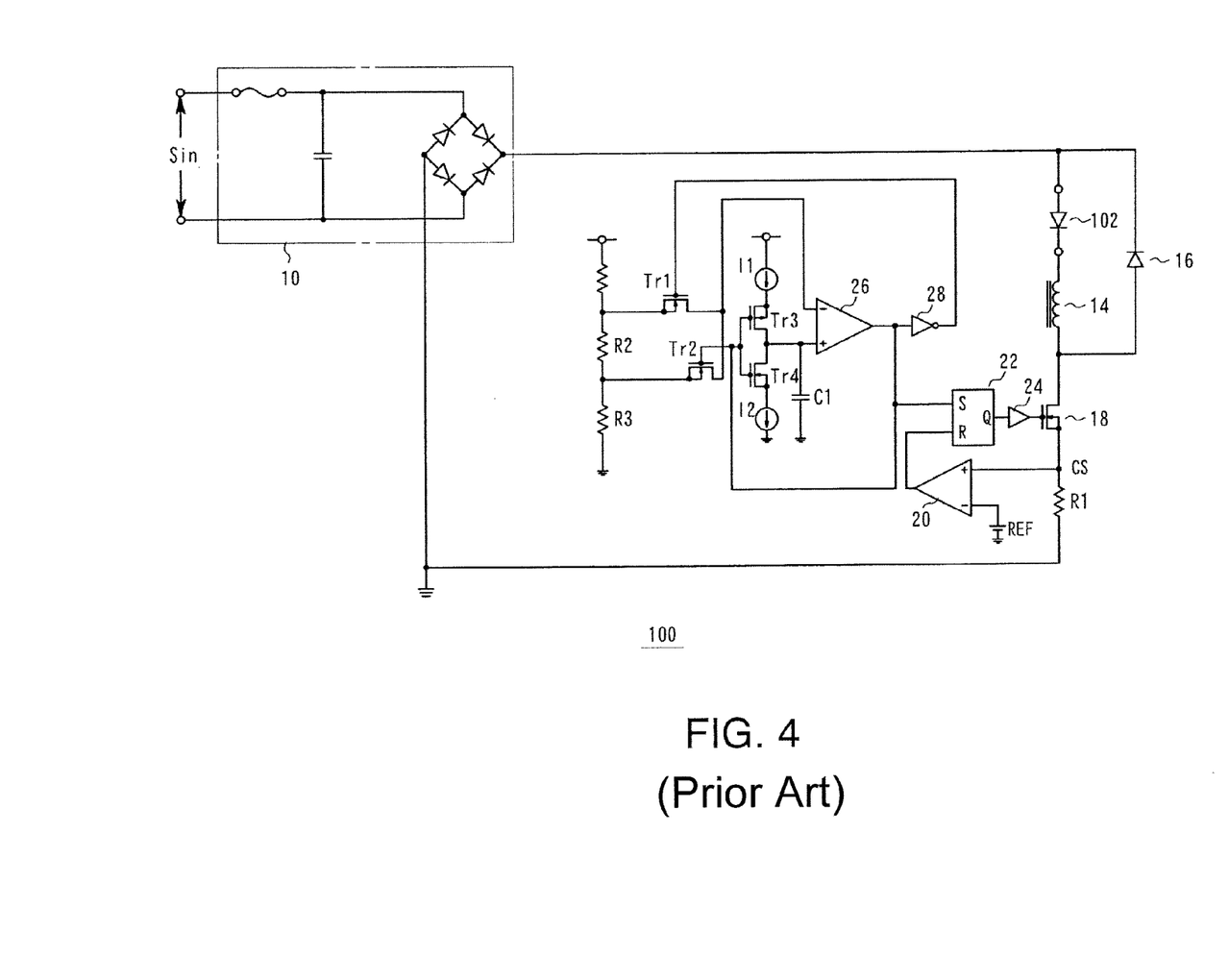
FIG. 4 is a diagram showing a structure of a control circuit of a light-emitting element (LED) of the related art.
Figure 5:
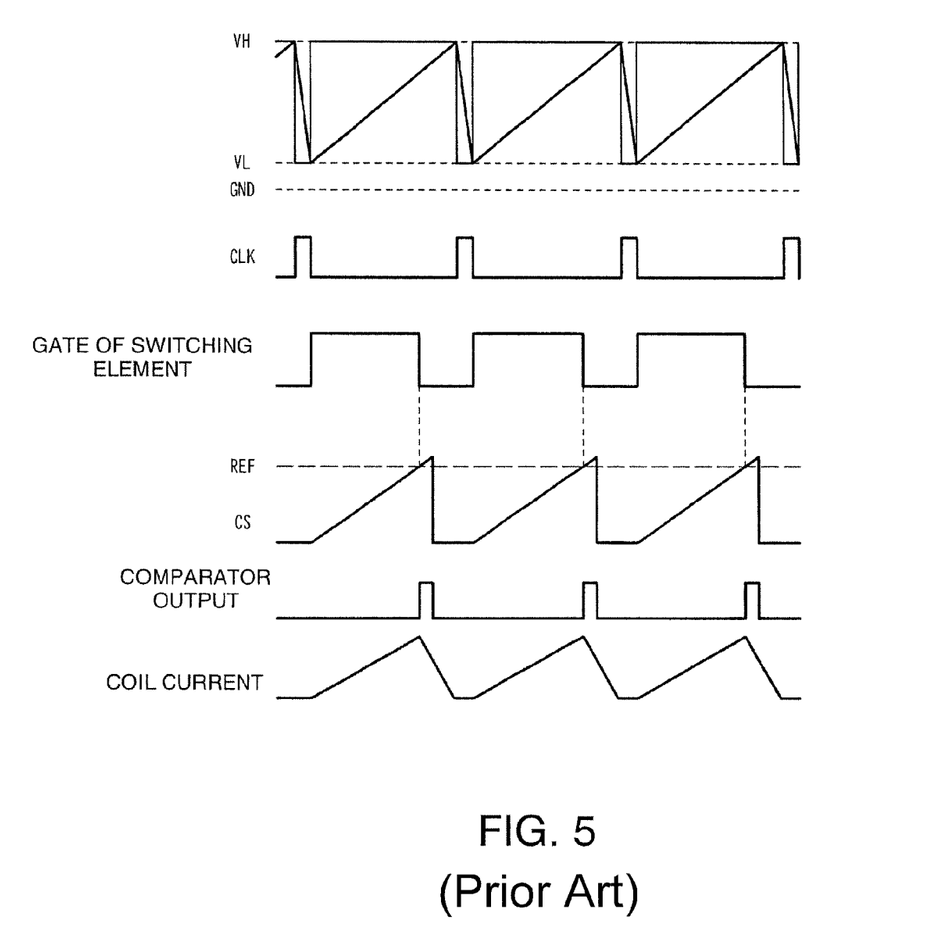
FIG. 5 is a timing chart showing an operation of the control circuit of the light-emitting element of the related art.

FIG. 4 shows a control circuit 100 of an illumination system in the related art. The control circuit 100 comprises a rectifying unit 10, a choke coil 14, a regenerative diode 16, a switching element 18, a first comparator 20, a latch unit 22, a buffer element 24, a second comparator 26, and a NOT element 28. FIG. 5 is a timing chart showing the control of the illumination system performed by the control circuit 100.

When an alternating current (AC) power supply is supplied to the rectifying unit 10, the AC power supply is full-wave rectified. The full-wave rectified voltage is supplied to an anode terminal of an LED 102 as a drive voltage. A cathode of the LED 102 is grounded through a series connection of the choke coil 14, the switching element 18, and a resistor element R1. Switching of the switching element 18 is controlled by a controller so that a current is supplied to the LED 102 through the choke coil 14, the switching element 18, and the resistor element R1, and light is emitted from the LED 102. In addition, the regenerative diode 16 which regenerates the energy stored in the choke coil 14 to the LED 102 when the switching element 18 is switched OFF is provided in parallel to the LED 102 and the choke coil 14.

A clock generator comprises the second comparator 26 and the NOT element 28. When a voltage V+ which is input to a non-inverting input terminal (+) of the second comparator 26 is higher than a voltage V– which is input to the inverted input terminal (–), an output of the second comparator 26 is at a high level (H). In this case, an output of the NOT element 28 is at a low level (L). The output of the NOT element 28 is applied to a gate terminal of a transistor Tr1, and the output of the second comparator 26 is applied to a gate terminal of a transistor Tr2. Therefore, when the output of the second comparator 26 is at the high level (H) and the output of the NOT element 28 is at the low level (L), the transistor Tr1 is set to the OFF state and the transistor Tr2 is set to the ON state, and a voltage VL is applied as the voltage V– of the inverted input terminal of the second comparator 26. In addition, the output of the second comparator 26 is applied to gate terminals of transistors Tr3 and Tr4. Therefore, when the output of the second comparator 26 is at the high level (H), the transistor Tr3 is set to the OFF state and the transistor Tr4 is set to the ON state. The charges stored in a capacitor C1 are discharged by a current source 12, and a terminal voltage of the capacitor C1; that is, the voltage V+ which is input to the non-inverting input terminal of the second comparator 26, is gradually reduced.

When the terminal voltage of the capacitor C1; that is, the voltage V+ which is input to the non-inverting input terminal of the second comparator 26, is reduced to a voltage lower than the voltage VL which is input to the inverted input terminal of the second comparator 26, the output of the second comparator 26 is switched from the high level (H) to the low level (L).

In this process, the output of the NOT element 28 is at the high level (H). When the output of the second comparator 26 is at the low level (L) and the output of the NOT element 28 is at the high level (H), the transistor Tr1 is set to the ON state and the transistor Tr2 is set to the OFF state, and the voltage V– of the inverted input terminal of the second comparator 26 is at a voltage VH which is higher than the voltage VL. In addition, when the output of the second comparator 26 is at the low level (L), the transistor Tr3 is set to the ON state and the transistor Tr4 is set to the OFF state. The capacitor C1 is charged by a current source I1, and the terminal voltage of the capacitor C1; that is, the voltage V+ which is input to the non-inverting input terminal of the second comparator 26, is gradually increased.

By repeating these operations, the clock generator generates and outputs a clock signal CLK which rises in a pulse shape at a constant period. The latch unit 22 comprises an SR latch circuit. The latch unit 22 receives the clock signal CLK at a set terminal S, and sets an output signal Q to the high level (H) when the clock signal CLK rises. The output signal Q is applied to a gate terminal of the switching element 18 through the buffer element 24, the switching element 18 is switched ON at timing when the pulse of the clock signal CLK rises, and current flows to the LED 102.

Meanwhile, to the first comparator 20, there are input a comparison voltage CS which is generated at both terminals of the resistor element R1 by the current flowing to the LED 102 and a constant reference voltage REF. An output of the first comparator 20 is input to a reset terminal R of the latch unit 22. The first comparator 20 outputs a low level (L) when the comparison voltage CS is lower than the reference voltage REF. In this case, the latch unit 22 maintains a current state, and the current flowing to the LED 102 is increased. The output of the first comparator 20 is switched to the high level (H) at timing when the comparison voltage CS becomes larger than the reference voltage REF. With this process, the latch unit 22 is reset, the switching element 18 is switched OFF, and the current to the LED 102 is stopped. In this manner, the current flowing to the LED 102 can be controlled, and an average light-emission intensity of the LED 102 can be controlled.

When the light-emitting element is operated at a fixed clock frequency using the control circuit 100 of the light-emitting element as shown in FIG. 4, a spike noise occurs in a frequency band near the clock frequency, and there may be generated an electromagnetic noise (EMI) which exceeds a standard value necessary as the control circuit 100.

SUMMARY

According to one aspect of the present invention, there is provided a control circuit of a light-emitting element which controls a light-emission intensity of the light-emitting element, comprising a rectifying unit which full-wave rectifies an alternating current power supply, a clock generator which generates and outputs a clock signal, a first comparator which compares a comparison voltage corresponding to a current flowing to the light-emitting element and a first reference voltage, and a switching element which is set to an ON state in synchronization with the clock signal and which is set to an OFF state when the comparison voltage becomes greater than or equal to the first reference voltage at the first comparator, to switch the current flowing to the light-emitting element by a voltage rectified by the rectifying unit, wherein a period of the clock signal generated by the clock generator is varied.

BRIEF DESCRIPTION OF THE DRAWINGS

A preferred embodiment of the present invention will be described in further detail based on the following drawings, wherein.

DESCRIPTION OF EMBODIMENT

Figure 1:
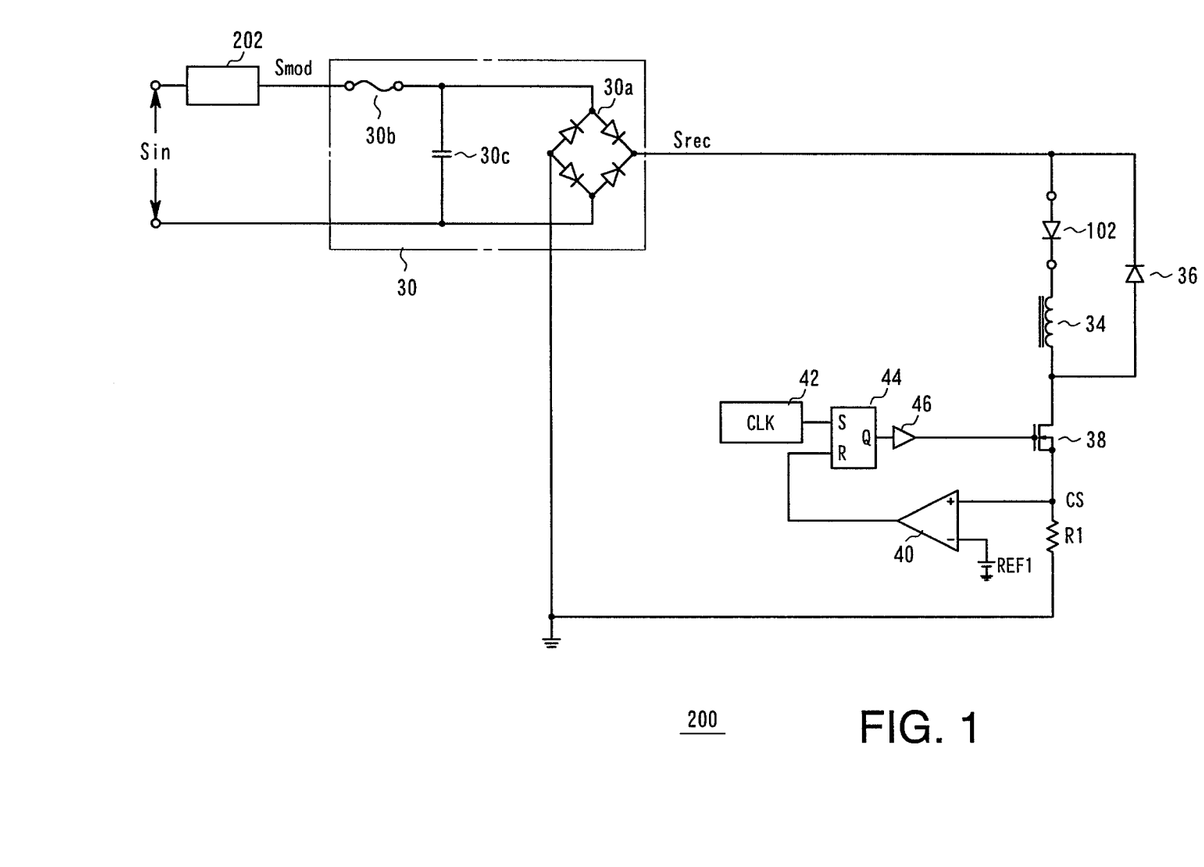
FIG. 1 is a diagram showing a structure of a control circuit of a light-emitting element according to a preferred embodiment of the present invention.
Figure 2:
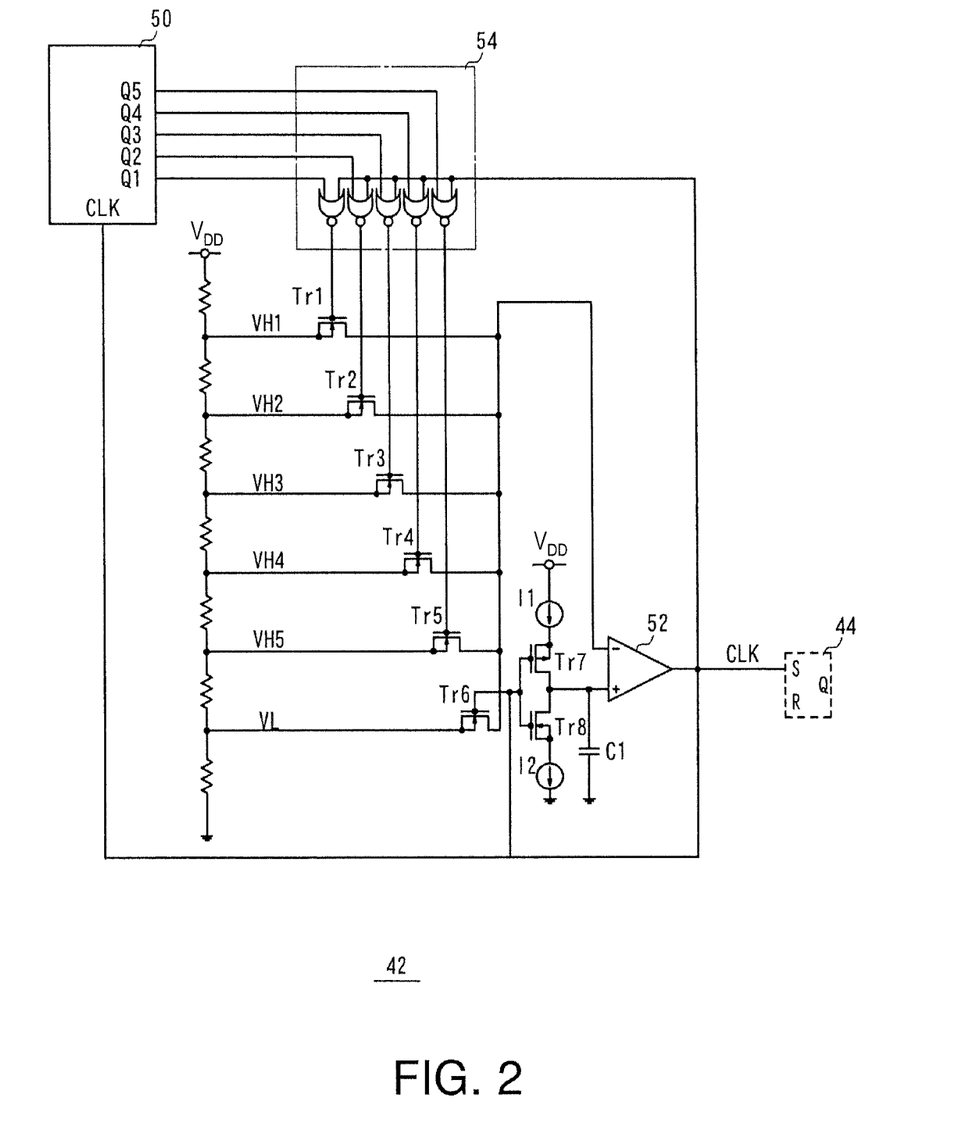
FIG. 2 is a diagram showing a structure of a clock generator in the preferred embodiment of the present invention.

As shown in FIG. 1, a control circuit 200 of a light-emitting element according to a preferred embodiment of the present invention comprises a rectifying unit 30, a choke coil 34, a regenerative diode 36, a switching element 38, a first comparator 40, a clock generator 42, a latch unit 44, and a buffer element 46. FIG. 2 is a diagram showing an internal structure of the clock generator 42.

Figure 3:
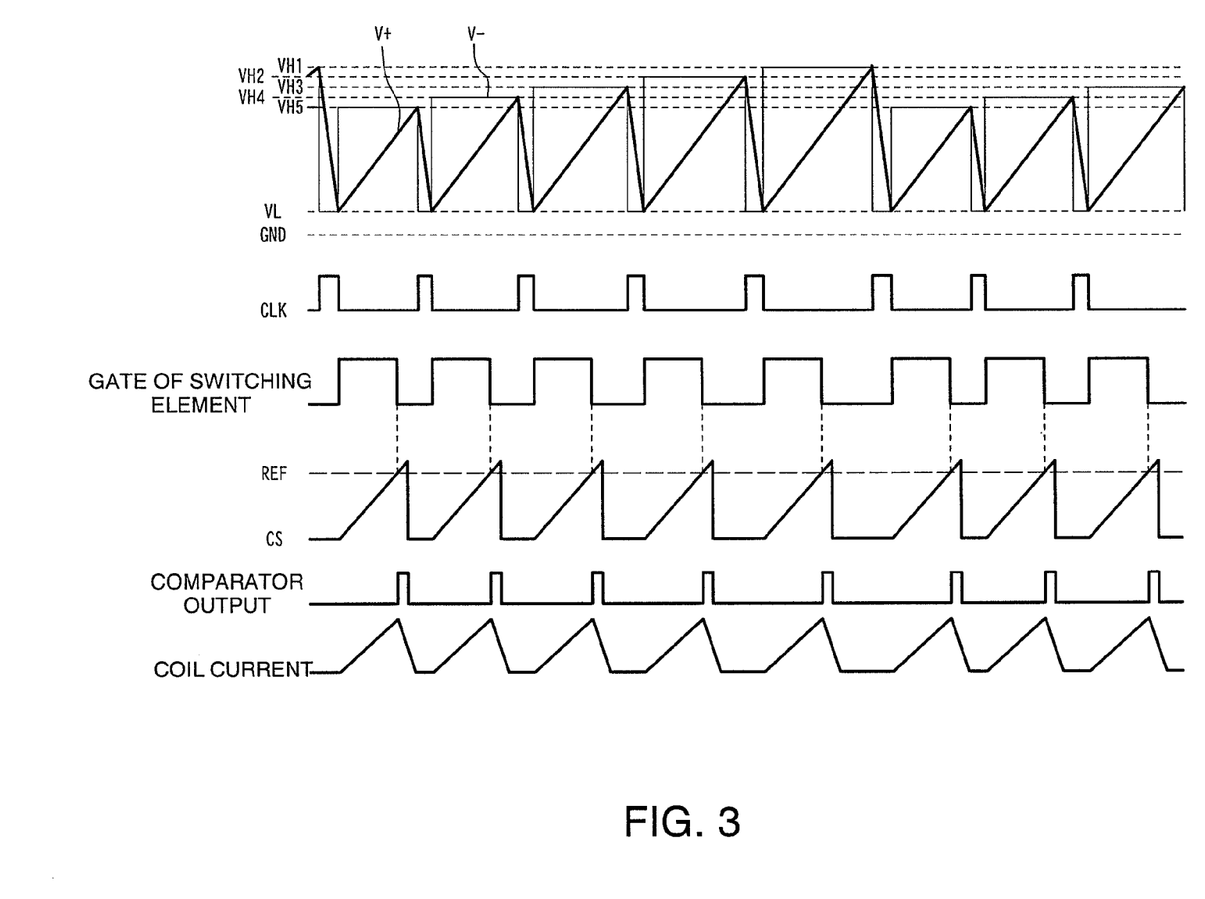
FIG. 3 is a timing chart showing an operation of the control circuit of the light-emitting element in the preferred embodiment of the present invention.

The control circuit 200 controls light emission of the light-emitting element. For example, the control circuit 200 is connected to a light-emitting diode (LED) 102 for illumination, and controls a current flowing to the LED 102. FIG. 3 shows voltages and currents at various sections of the control circuit 200 according to the present embodiment.

The control circuit 200 is connected to a dimmer circuit 202 which controls a conduction angle of an alternating current (AC) voltage Sin used in a dimmer system of an incandescent lamp. The dimmer circuit 202 is connected to the rectifying unit 30 of the control circuit 200. That is, the dimmer circuit 202 receives the AC voltage Sin, adjusts the conduction angle of the AC voltage Sin according to an adjustment signal such as the dimmer volume, and outputs an adjusted AC voltage Smod.

The rectifying unit 30 comprises a rectifying bridge circuit 30a. The rectifying unit 30 receives the adjusted AC voltage Smod, full-wave rectifies the adjusted AC voltage Smod, and outputs the result as a full-wave rectified voltage Srec. As shown in FIG. 1, a fuse 30b for protection and a filter 30c for noise removal may be provided in the rectifying unit 30.

On the downstream side of the rectifying unit 30, the light is emitted from the LED 102 according to the full-wave rectified voltage Srec, so that LED 102 can be dimmed by the dimmer circuit 202.

The full-wave rectified voltage Srec is supplied to an anode terminal of the LED 102. A cathode terminal of the LED 102 is grounded through the choke coil 34, the switching element 38, and a voltage detecting resistor R1.

The choke coil 34 is provided in order to make the current flowing through the LED 102 and the switching element 38 intermittent. Alternatively, a forward winding may be provided in the choke coil 34 in order to enable supply of a power supply voltage to various sections.

The switching element 38 is provided for supplying or stopping the current flowing to the LED 102. The switching element 38 is an element having a capacity corresponding to a power consumption of the LED 102, and, for example, a large-power field effect transistor (MOSFET) or the like is used.

The regenerative diode 36 is a flywheel diode, and is connected in parallel with the LED 102 and the choke coil 34. The regenerative diode 36 regenerates the energy stored in the choke coil 34 to the LED 102 when the switching element 38 is disconnected.

The clock generator 42 generates and outputs a clock signal CLK which rises in a pulse shape. The clock generator 42 of the present embodiment generates and outputs the clock signal CLK not at a constant period, but rather, while varying the interval between pulses. A structure and a function of the clock generator 42 will be described later in detail.

The latch unit 44 comprises an SR latch circuit. The latch unit 44 receives the clock signal CLK at a set terminal S, and sets an output signal Q to a high level (H) when the clock signal CLK rises. On the other hand, to the first comparator 40, there are input a comparison voltage CS generated at both terminals of the resistor element R1 by a current flowing through the LED 102 and a constant reference voltage REF. The reference voltage REF is a voltage which is used as a threshold for limiting the switching operation of the switching element 38. The comparison voltage CS is input to a non-inverting input terminal (+) and the reference voltage REF is input to an inverted input terminal (−). An output of the first comparator 40 is input to a reset terminal R of the latch unit 44.

The first comparator 40 outputs a low level (L) when the comparison voltage VS is lower than the reference voltage REF. In this process, the latch unit 44 maintains a current state. The output of the first comparator 40 is switched to the high level (H) at timing when the comparison voltage CS becomes larger than the reference voltage REF. With this process, the latch unit 44 is reset, and the output signal Q is set to the low level (L). The output of the latch unit 44 is applied to a gate terminal of the switching element 38 through the buffer element 46, the switching element 38 is switched ON at timing when the pulse of the clock signal CLK rises, and current is supplied to the LED 102. The output of the first comparator 40 is switched to the high level (H) at timing when the comparison voltage CS becomes larger than the reference voltage REF. With this process, the latch unit 44 is reset, the switching element 38 is switched OFF, and the current to the LED 102 is stopped. In this manner, the current flowing to the LED 102 can be controlled and the average light-emission intensity of the LED 102 can be controlled.

In the present embodiment, the clock signal CLK is output while varying the temporal interval of the pulses at the clock generator 42. The clock generator 42 will now be described with reference to FIGS. 2 and 3.

As shown in FIG. 2, the clock generator 42 comprises a counter 50, a second comparator 52, and a NOR element unit 54.

The counter 50 receives the clock signal CLK which is the output of the second comparator 52, and counts a counter value X in a descending order at timing when the clock signal CLK is changed from the low level (L) to the high level (H). The counter 50 sets to the low level (L) only the output terminal QX (where X is an integer from 1~5) of a number corresponding to the counter value X among output terminals Q1~Q5, and sets all other output terminals to the high level (H). The output terminals Q1~Q5 are input to respective NOR elements included in the NOR element unit 54.

In the example configuration of the clock generator 42 shown in FIG. 2, the counter 50 has a structure to cyclically count values of 1~5. More specifically, the counter 50 changes the counter value in the order of 5→4→3→2→1→5→ . . . at a timing when the clock signal CLK is changed from the low level (L) to the high level (H). When the counter value is 5, the counter 50 sets only the output terminal Q5 to the low level (L) and sets the other output terminals Q1~Q4 to the high level (H). When the counter value is 4, the counter 50 sets only the output terminal Q4 to the low level (L) and sets the other output terminals Q1~Q3 and Q5 to the high level (H). For the other counter values, similar settings are employed.

The second comparator 52 sets the clock signal CLK to the high level (H) when the voltage V+ which is input to the non-inverting input terminal (+) is higher than a voltage V− which is input to the inverted input terminal (−). In addition, the second comparator 52 sets the clock signal CLK to the low level (L) when the voltage V− which is input to the inverted input terminal (−) is higher than the voltage V+ which is input to the non-inverting input terminal (+). By repeating these two states, the second comparator 52 outputs the clock signal CLK of a pulse shape.

The clock signal CLK from the second comparator 52 is input to the NOR elements included in the NOR element unit 54. The output terminals of the NOR elements connected to the output terminals Q1~Q5 are connected to gate terminals of transistors Tr1~Tr5, respectively. An output of each NOR element of the NOR element unit 54 is set to the high level (H) when both of the respective one of the output terminals Q1~Q5 and the clock signal CLK which are input are at the low level (L), and is set to the low level (L) otherwise. In other words, when the clock signal CLK becomes the low level (L) in a period when the output terminal QX (where X is an integer from 1~5) corresponding to the counter value X of the counter 50 is at the low level (L), the output of the NOR element connected to the output terminal QX is set to the high level (H), and the transistor TrX (where X is an integer from 1~5) connected to the NOR element is set to the ON state. The other transistors are set to the OFF state. In this manner, when the clock signal CLK is at the low level (L), the terminal voltage VHX (where X is an integer from 1~5) corresponding to the counter value X is selected among the terminal voltages VH1~VH5 of the resistor elements which are connected in series, and is input to the inverted input terminal of the second comparator 52.

In addition, the clock signal CLK from the second comparator 52 is applied to gate terminals of transistors Tr7 and Tr8. When the output of the second comparator 52 is at the low level (L), the transistor Tr7 is set to the ON state and the transistor Tr8 is set to the OFF state, the capacitor C1 is charged by the current source 11, and the terminal voltage of the capacitor C1; that is, the voltage V+ which is input to the non-inverting input terminal of the second comparator 52, is gradually increased. When the voltage V+ becomes larger than the one of the terminal voltages VH1~VH5 which is input to the non-inverting input terminal of the second comparator 52, the output of the second comparator 52 is switched from the low level (L) to the high level (H).

Here, the terminal voltages VH1~VH5 of the resistor elements are in the relationship of VH5>VH4>VH3>VH2>VH1. As shown in FIG. 3, every time the clock signal CLK is switched from the high level (H) to the low level (L), the voltage which is input to the inverted input terminal of the second comparator 52 is switched in the order of the terminal voltage VH5→VH4→VH3→VH2→VH1→VH5→ . . . . Therefore, the charging period of the capacitor C1; that is, a period when the clock signal CLK is at the low level (L), is varied according to the voltage which is input to the inverted input terminal of the second comparator 52, among the terminal voltages VH1~VH5.

In addition, the clock signal CLK from the second comparator 52 is applied to a gate terminal of a transistor Tr6. Therefore, when the clock signal CLK is at the high level (H), the transistor Tr6 is set to the ON state, and the voltage VL is applied to the inverted input terminal of the second comparator 52. The voltage VL is a voltage which is lower than any of the terminal voltages VH1~VH5 of the resistor elements.

When the output of the second comparator 52 is at the high level (H), the transistor Tr7 is set to the OFF state and the transistor Tr8 is set to the ON state, and charges stored in the capacitor C1 are discharged by the current source 12. The terminal voltage of the capacitor C1; that is, the voltage V+ which is input to the non-inverting input terminal of the second comparator 52, is gradually reduced. In addition, when the terminal voltage of the capacitor C1; that is, the voltage V+ which is input to the non-inverting input terminal of the second comparator 52, is reduced to a voltage lower than the voltage VL which is input to the inverted input terminal of the second comparator 52, the output of the second comparator 52 is switched from the high level (H) to the low level (L).

The clock generator 42 generates and outputs the clock signal CLK by repeating these operations. As described above, in this process, the period of the clock signal CLK is varied according to the change in the counter value of the counter 50. With this process, the period when the switching element 38 is set to the ON state is also varied according to the change of the counter value of the counter 50. In this configuration, preferably, the voltage which is input to the inverted input terminal of the second comparator 52 is switched so that the frequency of the clock signal CLK is varied in a range of greater than or equal to ±5% and less than or equal to ±10% with respect to the central value. For example, when the clock signal CLK is switched in 5 stages, the terminal voltages VH1~VH5 are preferably set such that the frequencies of the clock signal CLK are set to 0.93f, 0.965f, f, 1.035f, and 1.07f.

As described, in the control circuit 200 in the present embodiment, the period of the clock signal CLK is varied at all times, to widen the frequency distribution of the spike noise. Therefore, influences of noise at a particular frequency can be reduced or inhibited.

In the present embodiment, the counter value of the counter 50 is cyclically counted in descending order. Alternatively, there may be employed a configuration in which the counter value is alternately counted in ascending order and in descending order. For example, when the counter value is changed within a range of 1~5, the counter value may be sequentially changed in the order of 1→2→3→4→5→4→3→4→2→1→2→ . . . . In addition, although one potential is selected according to the count, the potential may alternatively be randomly switched according to the count.

In the control circuit 200 of the present embodiment, there is employed a configuration in which the period of the clock signal CLK is varied in 5 stages. The present invention, however, is not limited to such a configuration, and the period of the clock signal CLK can be varied in an arbitrary number of stages by changing the count range of the counter 50, the terminal voltages of the resistor elements, the number of transistors, etc.

In the present embodiment, the VL level is fixed and the VH level is switched according to the counter. Alternatively, the VH level may be fixed and the VL level may be switched according to the counter.

Moreover, in the present embodiment, there has been shown an example configuration in which the VL level or the VH level is switched according to the counter, but alternatively, there may be employed a configuration in which the VL level and the VH level are fixed, and an amount of current for charging and discharging by I1 and I2 may be switched according to the counter.

What is claimed is:

1. A control circuit of a light-emitting element which controls a light-emission intensity of the light-emitting element, comprising:
   a rectifying unit which full-wave rectifies an alternating current power supply;
   a clock generator which generates and outputs a clock signal;
   a first comparator which compares a comparison voltage corresponding to a current flowing to the light-emitting element and a first reference voltage; and
   a switching element which is set to an ON state in synchronization with the clock signal and which is set to an OFF state when the comparison voltage becomes greater than or equal to the first reference voltage at the first comparator, to switch the current flowing to the light-emitting element by a voltage rectified by the rectifying unit,
   wherein the clock generator comprises:
      a counter which changes a counter value in synchronization with the clock signal;
      a capacitor which switches between charging and discharging in synchronization with the clock signal;
      a reference voltage selector unit which selects one of a plurality of terminal voltages as a second reference voltage based on a counter value of the counter;
      a second comparator which compares the second reference voltage which is selected by the reference selector unit and a terminal voltage of the capacitor, and wherein
      the second comparator outputs a pulse as the clock signal by switching an output state according to a comparison result of the second reference voltage and a voltage according to the terminal voltage of the capacitor.

2. A control circuit of a light-emitting element which controls a light-emission intensity of the light-emitting element, comprising:
   a rectifying unit which full-wave rectifies an alternating current power supply;
   a clock generator which generates and outputs a clock signal;
   a first comparator which compares a comparison voltage corresponding to a current flowing to the light-emitting element and a first reference voltage; and
   a switching element which is set to an ON state in synchronization with the clock signal and which is set to an OFF state when the comparison voltage becomes greater than or equal to the first reference voltage at the first comparator, to switch the current flowing to the light-emitting element by a voltage rectified by the rectifying unit,
   wherein the clock generator comprises:
      a counter which changes a counter value in synchronization with the clock signal;
      a reference current source which changes an amount of current for charging or discharging according to the counter value of the counter;
      a capacitor which switches between the charging and the discharging in synchronization with the clock signal and is charged and discharged by the current for the charging or the discharging supplied from the reference current source;
      a reference voltage output unit which selects one of a plurality of voltages in accordance with a counter value of the counter and outputs the selected voltage as a second reference voltage; and
      a second comparator which compares a terminal voltage of the capacitor and the second reference voltage, and
      the second comparator outputs a pulse as the clock signal by switching an output state according to a comparison result of the second reference voltage and a voltage according to the terminal voltage of the capacitor.

* * * * *